Patented Feb. 14, 1939

2,147,312

UNITED STATES PATENT OFFICE 2,147,312

COMPOSITION TO PREVENT STICKING OF RUBBER COMPOUNDS AND METHOD OF PREPARING THE SAME

Edward G. Partridge, Stow, Ohio, assignor to The B. F. Goodrich Company, New York, N. Y., a corporation of New York No Drawing. Application September 4, 1936, Serial No. 99,457

5 Claims. (Cl. 91—68)

This invention relates to the processing of rubber stocks and more particularly to the treatment of slabs of unvulcanized rubber compositions to keep them from sticking together. Heretofore, it has been customary to dust slabs of milled rubber with powdered soapstone, or other dry pigment or to apply suspensions of such pigments in water to the surfaces of said rubber slabs. During handling of the rubber stock in storage and processing, the excess dust falls off the rubber onto the floors, equipment and other rubber articles in process of manufacture, thus requiring cleaning of floors and equipment. Defective finished rubber articles may also result, due to the presence of said dust. The above treatments of surfaces of rubber goods may also result in incorporation of appreciable quantities of soapstone or other dusting materials into the rubber compounds during processing, which may have a deleterious effect upon the quality of the articles made from the compounds.

The present invention overcomes all of these objections by coating the rubber slabs with a tightly adherent dried coating.

This invention consists of the process of coating milled rubber stocks with a water paint which leaves, upon drying, a tightly adherent non-tacky film on the surface of the rubber, and of the paint so used. The paint consists essentially of a suspension of colloidal clay in water, and a wetting agent. Pigment may be added as desired to increase the body of the paint. Said paint may be applied to the rubber by dipping, spraying or any other desirable means.

*Example 1.*—20 pounds of bentonite clay is mixed with water to form a paste. The paste is then diluted with water till the total volume is 100 gallons. 0.2% of the total weight of the mix of a wetting agent, such as the sodium salt of di-isobutyl naphthalene sulphonic acid, is added.

*Example 2.*—To the mix as prepared in Example 1, are added 80 pounds of dry soapstone with thorough agitation.

*Example 3.*—To the mix as described in Example 1, are added 160 lbs. of dry soapstone with thorough agitation.

For tough rubber batches which do not flow in storage, the paint described in Example 1 is a satisfactory coating material. For softer rubber stocks, which flow in storage, where a thicker coat is desirable, the paints described in Examples 2 and 3 are more suitable.

It has been found that milled rubber slabs coated with any of these paints do not stick together when piled one on the other, that the coating is tightly adherent, does not dust or rub off, and that, in spite of the presence of pigment as described in Examples 2 and 3, rubber batches coated with these paints do not retain deleterious amounts of soapstone during further processing.

Colloidal clay such as is variously termed bentonite, wilkinite, etc. is an essential ingredient of these paints and cannot be replaced by ordinary clays, for only the colloidal clay is capable of producing the tightly adherent film which constitutes the most important advantage of these new paints. Any convenient wetting agent such as the well known hymolal sulphates, complex alkyl naphthalene sulphonates, soaps of naphthenic acids, or even saponin or ordinary soap may be substituted for the specific compound mentioned above with such changes in proportion as may be required by their relative activity, but it is preferred to use one of the highly active neutral synthetic wetting agents of which a large number are now known, since the presence of an appreciable quantity of an alkaline material such as an ordinary soap would have an undesirable influence on the subsequent vulcanization of the rubber. The pigment, if used, may be any of those ordinarily used for such purposes, including soapstone, ground mica, clay and the like.

I claim:

1. The process of removing tack from the surface of unvulcanized rubber, which consists in coating the rubber with a water paint consisting essentially of a suspension of powdered soapstone and a colloidal clay in water containing a saponaceous wetting agent.

2. A paint for removing the surface tack of unvulcanized rubber consisting essentially of a suspension of bentonite clay in water, a saponaceous wetting agent, and pigment.

3. A paint for removing the surface tack of unvulcanized rubber consisting essentially of a suspension of bentonite clay in water, a saponaceous wetting agent, and powdered soapstone.

4. A paint for removing the surface tack of unvulcanized rubber consisting essentially of a suspension of pulverulent minerals including a colloidal clay, in water containing a saponaceous wetting agent.

5. A paint for removing the surface tack of unvulcanized rubber consisting essentially of a suspension of pulverulent minerals including bentonite clay, in water containing a neutral saponaceous wetting agent.

EDWARD G. PARTRIDGE.